(12) United States Patent
Jenkins

(10) Patent No.: US 7,493,270 B1
(45) Date of Patent: Feb. 17, 2009

(54) METHOD OF ENGAGING IN ONE OR MORE TRANSACTIONAL ACTIVITIES ON THE INTERNET WITH LIMITED LIABILITY TO AN INITIATOR

(76) Inventor: Gerald L. Jenkins, 1235 Linden Ave., Highland Park, IL (US) 60035

( * ) Notice: Subject to any disclaimer, the term of this patent is extended or adjusted under 35 U.S.C. 154(b) by 0 days.

(21) Appl. No.: 09/790,833

(22) Filed: Feb. 22, 2001

Related U.S. Application Data

(60) Provisional application No. 60/183,805, filed on Feb. 22, 2000.

(51) Int. Cl.
*G06Q 30/00* (2006.01)
(52) U.S. Cl. .................................. 705/26; 705/1; 705/27
(58) Field of Classification Search ...................... 705/4, 705/26, 27, 38, 39, 44, 54, 56, 64, 74, 80, 705/37, 1
See application file for complete search history.

(56) References Cited

U.S. PATENT DOCUMENTS 5,920,848 A * 7/1999 Schutzer et al. ................ 705/42
6,477,513 B1 * 11/2002 Walker et al. .................. 705/76

(Continued)

FOREIGN PATENT DOCUMENTS

WO 200161579 * 8/2001

OTHER PUBLICATIONS

Google online search results for "limited liability company and e-commerce".*

(Continued)

*Primary Examiner*—Jeffrey A. Smith
*Assistant Examiner*—Michael Misiaszek
(74) *Attorney, Agent, or Firm*—Husch Blackwell Sanders Welsh & Katz

(57) ABSTRACT

A method of engaging in transactional activities on the Internet without substantial human direction or risk of liability after establishing an established purpose that benefits an initiator being capable of execution by the intelligent automated agent includes several steps. One of the steps is providing an intelligent automated agent having at least one ability to engage in transactional activities on the Internet that can benefit the initiator. Another step is providing, via the automated intelligent agent's functionality, limited flexibility company means for limiting liability having one or more corporate purposes including at least the established purpose that can benefit the initiator, the corporate purpose limiting the activities the limited flexibility company means may engage in and providing a limit to liability attaching to the engaging of activities within said one or more corporate purposes, the limited flexibility company means requiring capitalization and having the capability of owning an intelligent automated agent. Yet another step is vesting ownership of the intelligent automated agent in the limited flexibility company means. A further step is transacting business with the intelligent automated agent according to the intelligent automated agent's ability to execute the established purpose that can benefit the initiator. Another step is providing adequate capitalization for the limited flexibility company means. In the method, the transactional activities of the intelligent automated agent on behalf of the initiator on the Internet obtain the benefit of the limit to liability of the limited flexibility company means, and the intelligent agent engages in transactional activities on behalf of the limited flexibility company means to execute the established purpose that can benefit the initiator.

4 Claims, 4 Drawing Sheets

U.S. PATENT DOCUMENTS

| | | | |
|---|---|---|---|
| 6,549,888 B1* | 4/2003 | Aieta et al. | 705/4 |
| 6,567,791 B2* | 5/2003 | Lent et al. | 705/38 |
| 6,594,642 B1* | 7/2003 | Lemchen | 705/26 |
| 6,598,027 B1* | 7/2003 | Breen, Jr. et al. | 705/26 |
| 6,604,080 B1* | 8/2003 | Kern | 705/4 |
| 2001/0011246 A1* | 8/2001 | Tammaro | 705/38 |
| 2001/0018739 A1* | 8/2001 | Anderson et al. | 713/176 |
| 2002/0010684 A1* | 1/2002 | Moskowitz | 705/75 |
| 2002/0029350 A1* | 3/2002 | Cooper et al. | 713/200 |
| 2002/0032646 A1* | 3/2002 | Sweeney et al. | 705/38 |
| 2002/0046157 A1* | 4/2002 | Solomon | 705/37 |
| 2002/0128958 A1* | 9/2002 | Slone | 705/37 |
| 2002/0138400 A1* | 9/2002 | Kitchen et al. | 705/37 |
| 2002/0184102 A1* | 12/2002 | Markopoulos et al. | 705/26 |
| 2003/0233305 A1* | 12/2003 | Solomon | 705/37 |

OTHER PUBLICATIONS

Google online serach results for "limited liability company".*
Silvia Feliu article on "Intelligent Agents and Consumer Protection", Aug. 2001, Electronic Commerce Legal Issues Platform website.*
West Legal Studies in Business website, 2001, Chapter 32- Liability to Third Parties and Termination, The Use of Intelligent Agents article.*
"Incorporate Online! You can Incorporate Your Business in Any State!" <http://www.llc.com>, dated Jan. 25, 1999 Retrieved via Internet Archive (www.archive.org).*
Juridical—OneLook Dictionary Search dated Aug. 5, 2005.
File History for U.S. Appl. No. 60/162,932, filed Nov. 1, 1999 for Neal Solomon.
File History for U.S. Appl. No. 60/183,638, filed Feb. 18, 2000 for Robin Ross Cooper.
File History for U.S. Appl. No. 60/182,015, filed Feb. 11, 2000 for Robin Ross Cooper.
Printout of Incorporate NOW! webpage date stamped May 8, 2006 10:44 AM. http://web.archive.org/web/19990508180506/www.llc.com/html/incrop..., Copyright 1995-1999.
Printout of LLC Formation Order Status Information—The Company Corporation webpage date stamped May 8, 2006 10:48 AM. https://www.corporate.com/doOrderStatusStart.do..., Copyright 1993-2006.
Article entitled 2005 Annual Report—Delaware Department of State, Division of Corporations written by Delaware Secretary of State Dr. Harriet Smith Windsor, Ed.D. dated Jan. 31, 2006.

* cited by examiner

| Form LLC-5.5<br>January 2000 | Illinois<br>Limited Liability Company Act | This space for use by<br>Secretary of State |
|---|---|---|
| Jesse White<br>Secretary of State<br>Department of Business Services<br>Limited Liability Company Division<br>Room 359, Howlett Building<br>Springfield, IL 62756<br>http://www.sos.state.il.us | Articles of Organization | |
| | SUBMIT IN DUPLICATE<br>Must be typewritten<br><br>This space for use by Secretary of State | |
| Payment must be made by certified check, cashier's check, Illinois attorney's check, Illinois C.P.A.'s check or money order, payable to "Secretary of State." | Date<br>Assigned File #<br>Filing Fee      $400.00<br>Approved: | |

1. Limited Liability Company Name: _____

(The LLC name must contain the words limited liability company, L.L.C. or LLC and cannot contain the terms corporation, corp., incorporated, inc., ltd., co., limited partnership, or LP.)

2. If transacting business under an assumed name, complete and attach Form LLC-1.20.

3. The address of its principal place of business: (Post office box alone and c/o are unacceptable.)
   _____
   _____

4. The Articles of Organization are effective on: (Check one)

a) _____ the filing date, or b) _____ another date later than but not more than 60 days subsequent to the filing date: _____
   (month, day, year)

5. The registered agent's name and registered office address is:

Registered agent: _____
                     First Name        Middle Initial        Last Name Registered Office:  _____
   (P.O. Box and       Number            Street              Suite #
   c/o are unacceptable)
                     _____
                     City              ZIP Code             County 6. Purpose or purposes for which the LLC is organized: Include the business code # (IRS Form 1065).
   (If not sufficient space to cover this point, add one or more sheets of this size.)

"The transaction of any or all lawful business for which limited liability companies may be organized under this Act."

7. The latest date, if any, upon which the company is to dissolve _____ .
   (month, day, year)

Any other events of dissolution enumerated on an attachment. (Optional)

LLC-5.5

Figure 1a

LLC-5.5

8. Other provisions for the regulation of the internal affairs of the LLC per Section 5-5 (a) (8) included as attachment:

*If yes, state the provisions(s) from the ILLCA.*  ☐ Yes  ☐ No 9. a) Management is by manager(s):  ☐ Yes  ☐ No
   *If yes, list names and business addresses.* b) Management is vested in the member(s):  ☐ Yes  ☐ No
   *If yes, list names and addresses.*

10. I affirm, under penalties of perjury, having authority to sign hereto, that these articles of organization are to the best of my knowledge and belief, true, correct and complete.

Dated _____ , _____
    (Month/Day)           (Year)

Signature(s) and Name(s) of Organizer(s)     Business Address(es)

1. _____     1. _____
         Signature                              Number        Street
   _____        _____
     (Type or print name and title)                 City/Town
   _____        _____
     (Name if a corporation or other entity)     State            ZIP Code 2. _____     2. _____
         Signature                              Number        Street
   _____        _____
     (Type or print name and title)                 City/Town
   _____        _____
     (Name if a corporation or other entity)     State            ZIP Code 3. _____     3. _____
         Signature                              Number        Street
   _____        _____
     (Type or print name and title)                 City/Town
   _____        _____
     (Name if a corporation or other entity)     State            ZIP Code (Signatures must be in ink on an original document. Carbon copy, photocopy or rubber stamp signatures may only be used on conformed copies.)

LLC-4.5

Figure 1b

|  | Possible Amended | This space for use by |
|---|---|---|
| Jesse White<br>Secretary of State<br>Department of Business Services<br>Limited Liability Company Division<br>Room 359, Howlett Building<br>Springfield, IL 62756<br>http://www.sos.state.il.us | Limited Liability Company Act<br>Articles of Organization | Secretary of State |
| | SUBMIT IN DUPLICATE<br>Must be typewritten<br>This space for use by Secretary of State | |
| Payment must be made by certified check, cashier's check, Illinois attorney's check, Illinois C.P.A.'s check or money order, payable to "Secretary of State." | Date<br>Assigned File #<br>Filing Fee $400.00<br>Approved: | |

1. The name of the LLC will be assigned by the Secretary of State.

2. If transacting business under an assumed name, complete and attach Form LLC-1.20.

3. The address of its principal place of business:

[PPB Address Field]

4. The Articles of Organization are effective on: the filing date

5. The registered agent's name and registered office address is:

Registered agent:   [RA Name Field]

Registered Office:  [RA Address Field]

6. Purpose or purposes for which the LLC is organized:

"The transaction of any or all lawful business for which limited liability companies may be organized under this Act."

7. The latest date, if any, upon which the company is to dissolve is the tenth anniversary of the filing date

Figure 2a

LLC-5.5

8. Other provisions for the regulation of the internal affairs of the LLC per Section 5-5 (a) (8) included as attachment:

The member shall be personally liable to the obligations of the LLC up to a maximum amount of: [Positive Integer Field]

9. a) Management is by: ☐ Manager ☐ Member

List name and address of Manager and Member as selected above

[M Name Field]
    [M Address Field]

Figure 2b

METHOD OF ENGAGING IN ONE OR MORE TRANSACTIONAL ACTIVITIES ON THE INTERNET WITH LIMITED LIABILITY TO AN INITIATOR

CROSS-REFERENCE TO RELATED APPLICATIONS

This application is based on U.S. provisional application No. 60/183,805, filed Feb. 22, 2000.

FIELD OF THE INVENTION

The field of the invention is methods for providing intelligent automated agents that are more useful to the initiators of such agents by providing limited liability for the activities of the intelligent automated agents.

BACKGROUND OF THE INVENTION

Intelligent automated agents (or bots) are software programs that serve a specific need for a person or, in theory, for another intelligent automated agent. The intelligent automated agent can be housed on the person's personal computer, on the person's local area network, on a third party's server or on some combination of the foregoing alternatives. Examples of intelligent automated agents are shopping bots that are told what the person wants to buy and that then search various Web sites to determine price and availability. Other intelligent automated agents allow participants in auctions to keep track of the progress of auctions of particular items. As technology advances, intelligent automated agents will become increasingly sophisticated and will complete more and more complex tasks.

In most cases today, who initiated the intelligent automated agent is known only to the person who initiated it and probably to the Web host on whose server the intelligent automated agent is located. If an intelligent automated agent is searching the Web for comparative prices, it can decline to inform the sites being searched as to who is trying to determine prices. In fact, people who are comparison shopping may find anonymity desirable.

As intelligent automated agents become more sophisticated (e.g., actually ordering an item), it can become advantageous to identify an intelligent automated agent (or its initiator) in a secure way. Otherwise, anyone that wants to harm another could create a intelligent automated agent that purports to be initiated by the other and instruct the intelligent automated agent to incur significant liabilities for the other. In addition, as intelligent automated agents become more sophisticated, programming errors will creep in. If a intelligent automated agent orders 10,000 toasters instead of one, and the initiator is not a toaster wholesaler, the results could be costly.

The most likely way that a intelligent automated agent will be tied to its initiator will be through the use of encryption. A much talked-about encryption systems is called public key infrastructure (PKI) and uses digital signatures and digital certificates. By "signing the intelligent automated agent" with a digital signature using a private key, the initiator could allow others to confirm that the intelligent automated agent "belonged" to her. Unfortunately, digital signatures are not foolproof. Although so-called "strong" encryption is extremely difficult to break, it is theoretically possible to do so, especially at the rate at which computing power is increasing. In addition, many users of the Web have not implemented strong encryption and use "weak" encryption instead. Finally, although the digital signatures themselves may be relatively secure, the keys on which they are based are long strings of 0s and 1s that are impossible to memorize. Most systems store the keys and allow users to access them using passwords or tokens. The passwords and tokens are typically relatively insecure.

For the foregoing reasons, no one will be able to control the intelligent automated agents that serve him (or purport to serve him) with absolute precision. Less sophisticated initiators, such as consumers who purchase such intelligent automated agents may have more problems, and will likely be less capable than experts at diagnosing possible sources of problems or liability. The inevitable glitches could create devastating results for the initiator of the intelligent automated agent.

One possible solution is to disavow, disclaim or sharply limit any liability for what the intelligent automated agent does. This is, however, more difficult in practice than in theory. Since intelligent automated agents operate solely on the initiator's computer (or a server being used on behalf of the initiator), no one other than the initiator will know what the scope of the intended authority of the intelligent automated agent is. Since intelligent automated agents do not typically identify themselves, no one will know the one with which he or she is dealing. Finally, since a intelligent automated agent could interact with persons or entities with whom it has no prior contractual relationship, its initiator may not be able to resolve all liability issues through the use of disavowals or disclaimers.

BRIEF SUMMARY OF THE INVENTION

It is an object of the present invention to provide a novel method for providing the initiator of a intelligent automated agent with limited liability protection covering actions taken by the intelligent automated agent.

Another object of the present invention is to provide a novel method for providing the initiator of a intelligent automated agent with limited liability protection by creating independent juridical status for the intelligent automated agent.

A further object of the present invention is to create an independent juridical status for a intelligent automated agent at low cost substantially instantaneously by electronic filing and review.

A method of engaging in transactional activities on the Internet without substantial human direction or risk of liability after establishing an established purpose that benefits an initiator being capable of execution by the intelligent automated agent includes several steps. One of the steps is providing an intelligent automated agent having at least one ability to engage in transactional activities on the Internet that can benefit the initiator. Another step is providing, via the automated intelligent agent's functionality, limited flexibility company means for limiting liability having one or more corporate purposes including at least the established purpose that can benefit the initiator, the corporate purpose limiting the activities the limited flexibility company means may engage in and providing a limit to liability attaching to the engaging of activities within said one or more corporate purposes, the limited flexibility company means requiring capitalization and having the capability of owning an intelligent automated agent. Yet another step is vesting ownership of the intelligent automated agent in the limited flexibility company means. A further step is transacting business with the intelligent automated agent according to the intelligent automated agent's ability to execute the established purpose that can benefit the initiator. Another step is providing adequate capitalization for the limited flexibility company means. In the method, the transactional activities of the intelligent automated agent on behalf of the initiator on the Internet obtain the benefit of the limit to liability of the limited flexibility company means, and the intelligent agent engages in transactional activities on behalf of the limited flexibility company means to execute the established purpose that can benefit the initiator.

BRIEF DESCRIPTION OF THE DRAWINGS

FIGS. 1a-b are pages of documents used to form limited liability companies in Illinois.

FIGS. 2a-b is a modified version of FIGS. 1a-b that illustrate how such a form can be modified to represent some principles of the present invention.

DETAILED DESCRIPTION OF THE INVENTION

Software agents have become relatively common in the Internet environment. Some (Bidfind at www.bidfind.com, Dealtime at www.dealtime.com) search online auctions to find what items are available at auction and at what prices. Others (mySimon at www.mysimon.com, StreetPrices at www.streetprices.com) search vendor sites to find out what items are available at vendor sites and at what prices. Both can effectively compare prices available at competing sites. Other software agents (Excite News Tracker at nt.excite.com, NewsHub at www.newshub.com) search online news sources to find relevant articles either by category or by key word.

Because each of the foregoing software agents is designed to be directed by the user and because people who direct agents are generally legally responsible for the actions of the agents they direct, it is possible that a software agent can lead to personal liability on the part of the person who directs it. This can be the case even if the person directing the agent is not aware of what the agent is doing. For example, if a person directs an agent to search for pricing information about items up for auction and the agent operates in such a way that it places a significant burden on the websites being searched or in a way that compromises the intellectual property of the website being searched, the owner of the damaged website may be able to sue the person who directed the software agent for the damages caused by the software agent.

A well-known example of how much damage an agent can cause is the software agents used in what are called distributed denial of service (DDOS) attacks. A large number of DDOS software agents are placed by a hacker on the computers of a number of unsuspecting computer users. The hacker then triggers all of the agents at once by a single instruction sent to the compromised computers. Each of the DDOS agents then floods the targeted website with a large volume of messages that demand significant resources of the website. The DDOS agents, working together, can bring the targeted website down and keep it offline for a period of time at great cost to the website owner. Based on current agency law, the person who directs any of the foregoing software agents would be personally liable for the damages caused by the software agent, even if the person is not aware of precisely what the agent does or how the agent does it. While the knowing and unlawful use of agents is not generally the subject of limited liability, or an intended use of this invention, this example makes the capacity of automated activities to harm others clear.

Even if the initiator were satisfied with the level of protection from liability that he could obtain on a contractual basis, in order to process complex tasks without significant user intervention, a universal mechanism with which the intelligent automated agent could communicate its disavowal or disclaimer would be useful. The mechanism could include one or more attributes (purpose, liability limit, nature of liability, duration, etc.) that are assignable to the intelligent automated agent by its initiator. For example, the intelligent automated agent could have a liability limitation attribute with choices of none, unlimited, or a fixed dollar amount. The initiator could then limit his liability to $400.00. Today, there is no universal mechanism to conduct such communications.

Another approach would be to treat intelligent automated agents as independent juridical beings and accord them separate legal status. Once intelligent automated agents themselves are accorded separate legal status, they can give their owners limited liability; then can own assets, they can incur debt; they can have net worth; they can even invent things. They could also be subject to fines for failure to pay tax or violation of the antitrust laws. In many cases, the initiator would also be liable (designing the intelligent automated agent not to pay tax, initiating the intelligent automated agent with the knowledge that it won't pay etc.). In other cases, the initiator may not be liable (software glitch, intelligent automated agent operates in an unanticipated way, etc.). Although private parties may try to create the effect of independent juridical status via contracts and other private party activities, they can never fully achieve the results. Tort and criminal liability may remain, and contracts may not cover all eventualities. A better alternative is to initiate intelligent automated agents under color of law.

Independent juridical status can be achieved in more than one way. First an automated intelligent agent effectively has independent juridical status when it is substantially the sole active agent for existing juridical beings such as corporations, limited liability companies, and the like Further, one or more states could create one or more new types of entities, either designed specifically for intelligent automated agents or designed for individuals, existing entities and intelligent automated agents. Some may operate like corporations or limited liability companies. Others may operate like general or limited partnerships. For example, a shopping intelligent automated agent might be initiated and credited with $400 (an actual bank account, cybercash, etc.) and told to buy a dishwasher. Since the intelligent automated agent's net worth is limited to $400, its initiator could never be found liable for the purchase of 10,000 dishwashers (absent fraud, intentional wrongdoing, etc.).

An example of such a intelligent automated agent might be a computer program that manufactures personal computers. A person knowledgeable about building and maintaining computers would initiate a intelligent automated agent that would be able to (i) solicit persons or intelligent automated agents who want a personal computer, (ii) negotiate the components, features, price, delivery terms, warranty terms, etc. with a person or intelligent automated agent, (iii) enter into an agreement with a person or intelligent automated agent, (iv) order the components, and (v) enter into, agreements with a person or intelligent automated agent willing to build the computer, another person or intelligent automated agent willing to ship it, another willing to supply customer service and another to supply maintenance and warranty coverage. The intelligent automated agent might have its own trade name, reputation and net worth. Alternatively, it may sell computers using the name of a well-known and trusted company that guarantees all of the obligations of the intelligent automated agent. If the purchaser is also a intelligent automated agent, it could be less complex than the manufacturing intelligent automated agent but would have similar legal authority. Both intelligent automated agents would enjoy the benefits of having the power to contract and giving their initiators the benefits of limited liability. Both would still be substantial enough to encourage others to contract with them.

Because the legal entity associated with the intelligent automated agent and the liabilities associated with owning and using it would be adequately defined, people could be more willing to initiate them and more willing to use them as an integral part of their business and personal affairs.

Once a intelligent automated agent is given independent juridical status, it would have at least a name, an address and an owner. The best way to do this would be through a statutory registration process. Such processes are provided by each of the fifty states of the United States, and information on these processes can be obtained from the governments of each of the states, usually through the Secretary of State of the state. Delaware is a particularly popular state for incorporation, and information is available at: www.state.de.us/sos.

The initiator of the intelligent automated agent could sign up, be issued in a unique name and become the owner of a registered intelligent automated agent. The intelligent automated agent could also be programmed by those of ordinary skill in the art to take advantage of automated incorporation systems by handling the processes of registration to the extent practicable without human intervention. Juridicial being registration functions might be done at the behest of an initiator, or could be done prior to purchase of the intelligent automated agent, or at any other time that would provide the initiator with the benefit of the corporate form associated with the intelligent automated agent. The most inexpensive way of doing this would be to use limited flexibility companies, detailed below.

The creation of a legal organization (corporation, limited partnership, limited liability company, etc.) is typically quite costly. The low end is in the $500 range (for a standard corporation with simple articles), and the high end can be a few thousand dollars (a limited liability company with a complicated organizational document). One of the reasons for the high cost is that the governmental authority regulating the entities must hire skilled individuals to review the organizational documents of the organization. The skilled individuals are needed because the governmental authority allows the organizational documents either to be created from scratch or to contain blanks that can be filled in with natural language responses (including, in many cases, attachments to the form). Since no present computer programs used for corporate registration adequately evaluate the natural language content, the only way that the organizational documents can be reviewed for correctness and legitimacy is to hire skilled personnel. The result is high filing fees and, sometimes, significant delays.

Although some organizations are so complex that they require the benefits of natural language responses and attachments, many others could be formed using a system that limits whoever creates the organization to a finite list of allowed provisions and a finite number of choices for each provision. Although some information could require a fill-in-the-blank response (level of capitalization, number of owners, names of owners, etc.), in each case the information could be limited to a finite range (e.g., level of capitalization must be more than $10 and less than $10,000,000 and must be an even dollar amount), or could entail information that regulators do not check anyway (e.g., names of individual owners).

As long as the list of possible provisions, the number of possible responses to each provision and the level of interconnectedness among provisions are not too complicated, it would be possible either to review all possible responses in advance or to review a specific group of responses only the first time that the group of responses is submitted at a cost dramatically lower than the costs currently being incurred evaluating natural language submissions.

With the use of electronic filings (or machine readable paper filings) and a desired format (e.g., standard database format, on-line form, XML document with the proper tags and attributes), individual filings could be read by computer, is compared to pre-approved sets of responses (which may or may not be published by the governmental authority in advance) and accepted if the responses fall within pre-approved ranges. The benefits would include dramatically lower costs that could be passed on to the person or entity requesting the formation of the organization and virtually instantaneous response times, Although the limitations imposed by the proposed system might not be sufficient to allow some unduly complicated organizations to be formed, current systems could remain in place to accommodate unusual situations. In addition, hybrid systems could be implemented that would allow limited natural language responses and limited human review. Presumably, the hybrid systems could be priced at a level between the current amounts being imposed and the cost of the pure limited flexibility company.

It is also possible to start with a short and straightforward set of responses (e.g., only a few provisions, some of which have only one alternative, others of which have only a few), to limit the type of organizations that can be created (single member only, capitalization of less than $1,000 etc.) that would make the review task very simple in the beginning, and to allow more and more complex alternatives over time.

EXAMPLE

FIGS. 1*a-b* show a current form for organizing limited liability companies in Illinois. FIGS. 2*a-b* show how such a form could be modified to limit liability in a way that would not require human review. Intelligent automated agents could be easily programmed by those skilled in the art to aid an initiator in filling out such forms, printing them, and mailing them to the appropriate authorities.

Papers of FIGS. 2*a-b* would not be required to institute a limited flexibility company. A registrar could have programmers of ordinary skill in the art design systems that can respond to electronic submissions and register corporations. The Patent and Trademark Office, for instance, currently scans Application Data Sheets, and accepts both patent and trademark applications in electronic form, both of which are substantially more complicated than an incorporation document.

Such an automated system could be used by an intelligent automated agent through the expedient of sending an email. Programmers of ordinary skill in the art could modify existing intelligent automated agents to send an email that would result in the formation of a limited flexibility company to own the intelligent automated agent, and provide limited liability to the initiator (or user) of the intelligent automated agent by having the initiator or any other appropriate person authorize the appropriate email.

I hereby request that a limited liability company be formed on behalf of the cardholder of VISA account number xxxx xxxx xxxx xxxx and that Articles of Organization be based on the following:
    PPBAddressField: xxxxxxxxxxxxxx
      xxxxxxxxxxxxxx
      xxxxxxxxxxxxxx
    RANameField: xxxxxxxxxxxxxx RAAddressField: xxxxxxxxxxxxxx
   xxxxxxxxxxxxxx
   xxxxxxxxxxxxxx
PostiveIntegerField:xxxxx
Management: [Member|Manager]
MNameField: xxxxxxxxxxxxxx
MAddressField: xxxxxxxxxxxxxx
   xxxxxxxxxxxxxx
   xxxxxxxxxxxxxx I affirm, under penalties of perjury, that the foregoing information is, to the best of my knowledge and belief, true, correct and complete.

What is claimed is:

1. A method of engaging in one or more transactional activities on the Internet with limited liability to an initiator comprising the steps of:
   a) providing an intelligent automated agent having at least one ability to engage in transactional activities on the Internet that can benefit the initiator;
   b) transmitting from the intelligent automated agent to an instrumentality of government, over the Internet, without human intervention, a plurality of provision selections, including the identity of an owner, an address, and a purpose that can benefit the initiator;
   c) receiving the plurality of provision selections transmitted by the automated intelligent agent by the instrumentality of government without human intervention;
   d) determining, without human determination, from the plurality of provision selections, whether a limited flexibility company means may be issued according to the laws of the instrumentality of government;
   e) issuing the limited flexibility company means to the owner, the limited flexibility company means having as its established purpose the purpose received from the intelligent automated agent, the address transmitted by the intelligent automated agent as its address, and the owner as transmitted by the intelligent automated agent as its owner;
   f) transmitting an identifier of the limited flexibility company means to the intelligent automated agent, the identifier comprising at least a name of the limited flexibility company means;
   g) vesting ownership of the automated intelligent agent in the limited flexibility company means;
   h) instigating, by the initiator, of at least one transactional activity within the scope of the established purpose of the limited flexibility company;
   i) engaging in the at least one transactional activity on the Internet for the benefit of the initiator with the automated intelligent agent under the ownership of the limited flexibility company means, so that the limited flexibility company means provides a limitation of liability for the initiator should the activities of the intelligent automated agent exceed the activities instigated by the initiator.

2. A method of engaging in one or more transactional activities on the Internet with limited liability to an initiator comprising the steps of:
   a) providing an intelligent automated agent having at least one ability to engage in transactional activities on the Internet that can benefit the initiator;
   b) transmitting from the intelligent automated agent to an instrumentality of government, over the Internet, without human intervention, a plurality of provision selections, including the identity of an owner, an address, and a purpose that can benefit the initiator that is limited to a single initiated transaction;
   c) receiving the plurality of provision selections transmitted by the automated intelligent agent by the instrumentality of government without human intervention;
   d) determining, without human determination, from the plurality of provision selections, whether a limited flexibility company means may be issued according to the laws of the instrumentality of government;
   e) issuing the limited flexibility company means to the owner, the limited flexibility company means having as its established purpose the purpose received from the intelligent automated agent, the address transmitted by the intelligent automated agent as its address, and the owner as transmitted by the intelligent automated agent as its owner;
   f) transmitting an identifier of the limited flexibility company means to the intelligent automated agent, the identifier comprising at least a name of the limited flexibility company means;
   g) vesting ownership of the automated intelligent agent in the limited flexibility company means;
   h) instigating, by the initiator, of a single transactional activity within the scope of the established purpose of the limited flexibility company;
   i) engaging in the transactional activity for the benefit of the initiator on the Internet with the automated intelligent agent under the ownership of the limited flexibility company means, so that the limited flexibility company means provides a limitation of liability for the initiator should the activities of the intelligent automated agent exceed the activity instigated by the initiator; and
   i) forbearing from instigating further transactional activities while the automated intelligent agent is owned by the limited flexibility company means.

3. A method according to claim 1, wherein the limited flexibility company means requires capitalization additionally comprising:
   providing adequate capitalization for the limited flexibility company means.

4. The method according to claim 1, wherein the limited flexibility company means provided has only one established purpose, and the intelligent automated agent means transacts business in accordance with that purpose.

* * * * *